INVENTOR.
CEBERN B. TRIMBLE
BY Louis A. Kline
HIS ATTORNEY

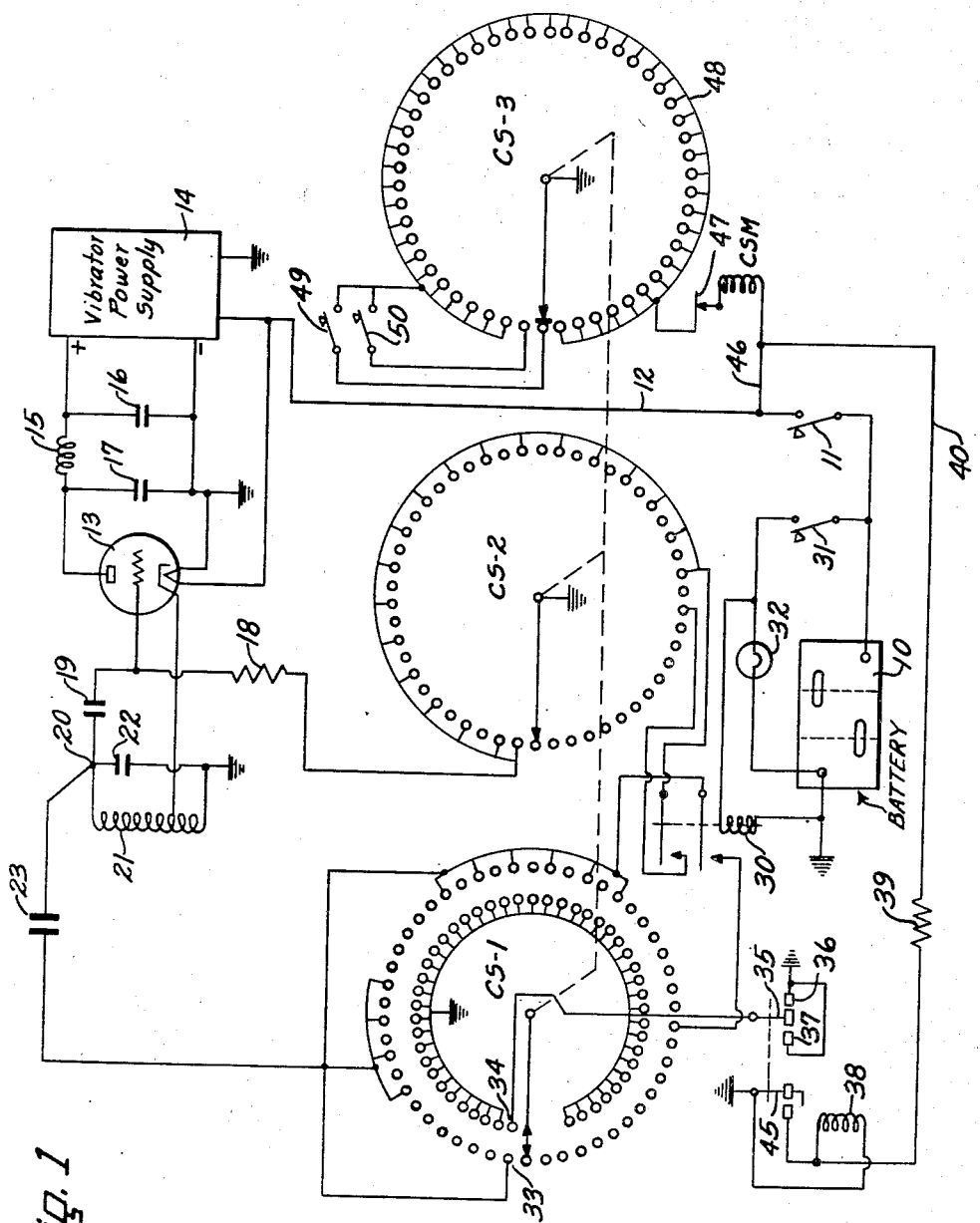

July 3, 1951

C. B. TRIMBLE 2,558,888

REMOTE CONTROL SYSTEM

Filed March 15, 1946

INVENTOR.
CEBERN B. TRIMBLE
BY
Louis A. Kline
HIS ATTORNEY

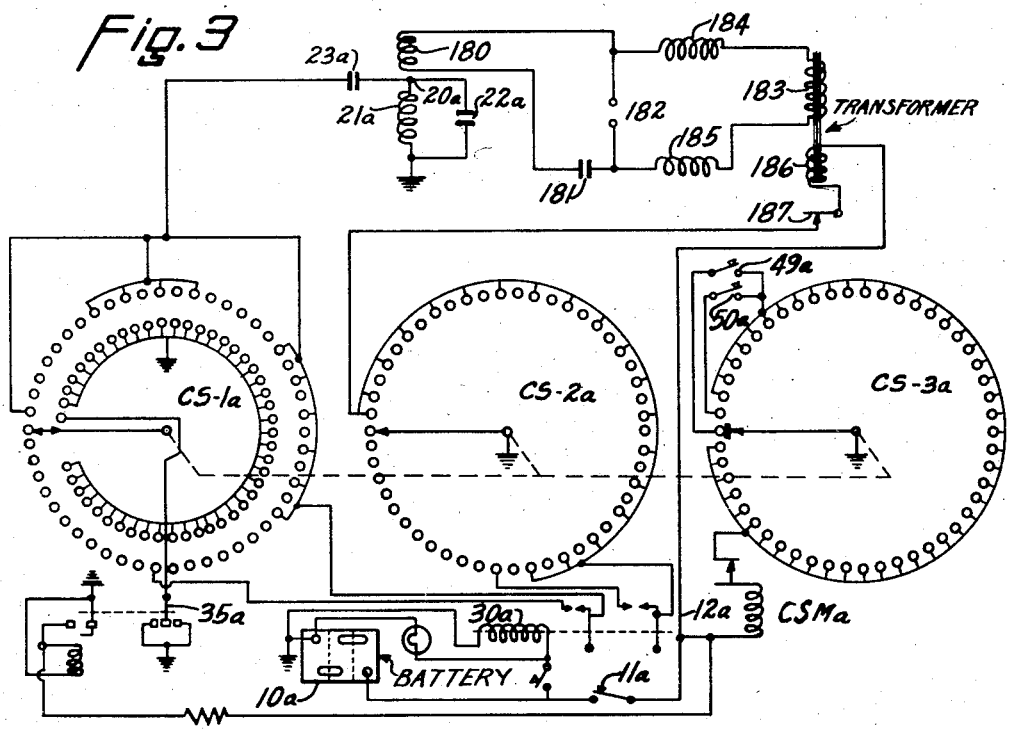
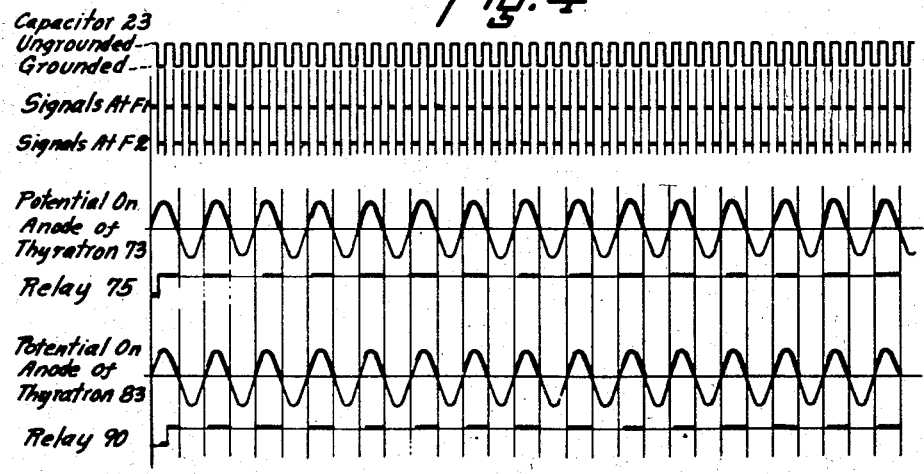

July 3, 1951  C. B. TRIMBLE  2,558,888
REMOTE CONTROL SYSTEM
Filed March 15, 1946  5 Sheets-Sheet 5

INVENTOR.
CEBERN B. TRIMBLE
BY Louis A. Kline
HIS ATTORNEY

Patented July 3, 1951

2,558,888

UNITED STATES PATENT OFFICE 2,558,888

REMOTE-CONTROL SYSTEM

Cebern B. Trimble, Dayton, Ohio

Application March 15, 1946, Serial No. 654,561

17 Claims. (Cl. 177—353)

This invention relates to remote control systems and particularly to a system utilizing a preassigned signal sequence containing various predetermined numbers of signals each consisting of oscillations at any one of a plurality of preselected frequencies, which signals are generated at a sending apparatus and are transmitted to a receiving apparatus, where they are effective to set up a control and thereby cause some other mechanism or mechanisms to operate if the proper signal sequence has been received.

In the novel control system, the sending apparatus can be arranged to send out a preassigned signal sequence containing a predetermined number of signals each consisting of oscillations at a selected frequency, $F_1$, followed by a further number of signals each consisting of oscillations at a different frequency, $F_2$, which may be followed by more signals at frequency $F_1$ and then more at frequency $F_2$, etc., until the desired signal sequence has been formed.

Electronic means are utilized to produce the signals, and, merely by changing a few simple electrical connections, any desired combinations of signals which are made up of oscillations at frequency $F_1$ and signals which are made up of oscillations at frequency $F_2$ may be obtained. These conditions enable a wide variety in signal sequences to be obtained and also enable changes in the signal sequences to be made readily.

The novel receiving apparatus, which is used with the above sending apparatus, may be connected to the sending apparatus by wire or may be coupled to the sending apparatus by either an electromagnetic field or an electrostatic field. Electronic means at the receiving apparatus has one portion which is responsive only to oscillations having a frequency corresponding to frequency $F_1$ of the sending apparatus, and has another portion which is responsive only to oscillations having a frequency corresponding to frequency $F_2$ of the sending apparatus. These portions of the electronic means, which respond to these frequencies, receive the various signals which contain these frequencies and cause related stepping switches to make a step of movement each time a signal of their particular frequency is received, which switches, together, complete circuits to control relays if the proper sequence of signals has been received. As in the sending apparatus, the receiving apparatus can be readily changed to respond to different signal sequences merely by changing a few circuit connections from the stepping switches to the control relays.

The sending apparatus also is provided with means which can cause a distinctive signal sequence to be sent to the receiving apparatus to cause the receiving apparatus to be operated to restore various parts of the receiving apparatus to home or normal position before the sequence of signals is sent thereto, thus insuring that the receiving apparatus will always be set properly before it begins to respond to the signal sequence and will cause the operation of some further means only if the proper signal sequence is received.

The special restoring signals may have a particular characteristic which distinguishes them from the signals of the signal sequence, or they may consist of a certain preselected combination of signals similar to those used in the signal sequence.

As will be clear from the following description, the sending apparatus may be arranged to send out a signal sequence made up of signals consisting of oscillations at any one of three or more different frequencies, and, when this is done, the receiving apparatus will consist of a corresponding number of portions which respond selectively to various ones of the frequencies. These various portions will cause stepping switches to be operated according to the signals received and effect some desired control if the required signal sequence has been received.

The invention is particularly adapted for use with a mobile sending apparatus, and, in view of this, the embodiment used to explain the invention will consist of a sending apparatus carried by an automobile from which it is desired to control a receiving apparatus remotely to cause the operation of a garage-door- or closure-operating mechanism, a light switch, and/or any other desired apparatus.

The sending apparatus and the receiving apparatus of this embodiment will be capable of generating and responding to a signal sequence using two frequencies and containing preselected numbers of signals which consist of oscillations at either of these frequencies.

The sending apparatus is coupled to the receiving apparatus either by an electromagnetic field or by an electrostatic field, depending upon the frequencies used in the signal sequence, the signals being radiated from an antenna or loop located behind the grill at the front of the automobile or at some other convenient location thereon and being received by an input means or antenna mounted on the garage, either inside or outside thereof.

With this antenna arrangement, the signal-receiving means of the receiving apparatus can be placed in existing structures without requiring that driveways or other approaches be torn up to receive the input means or antenna and without requiring that the antenna be placed along the driveway or approach. This is another important feature when the invention is embodied in the particular form being described and is being applied to existing structures.

It is an object of the invention, therefore, to provide a novel remote control system in which the sending apparatus and the receiving apparatus are compact and inexpensive and are adapted to generate and respond to a signal sequence which is capable of wide variations.

It is a further object of this invention to provide a novel remote control system which utilizes a signal sequence made up of selected numbers of discrete signals, each of which signals consists of oscillations at any one of a plurality of preselected frequencies.

A further object of the invention is to provide a sending apparatus which can generate a desired signal sequence containing a predetermined combination of different numbers of signals at a plurality of preselected frequencies.

A further object of the invention is to provide a receiving apparatus which can respond to various ones of the plurality of preselected frequencies and can set up a condition, upon the receipt of a desired signal sequence, to cause some other apparatus to be operated.

A further object of the invention is to provide a sending apparatus which can be adjusted readily to change the signal sequence which will be generated, and to provide a receiving apparatus which can be adjusted readily to change the controls and enable the receiving apparatus to cause an operation in response to a different signal sequence.

A further object of the invention is to provide a novel sending apparatus which can be operated to generate special restoring signals which operate a novel receiving apparatus to cause various parts of the receiving apparatus to be restored to their unoperated or starting position before the signal sequence is sent thereto.

A further object of the invention is to provide a remote control system which is particularly adapted for use in controlling the opening and closing of closures or garage doors from a vehicle such as an automobile.

A further object of the invention is to provide means in the sending apparatus in the vehicle or automobile for causing special control signals to be sent to the receiving apparatus to cause the operation of the closure-operating mechanism to be interrupted, if desired, before a complete operation thereof.

A further object of the invention is to provide a novel control system in which the sending and receiving apparatus can readily be incorporated in existing structures without requiring extensive alteration to the structures or the driveways or approaches thereto.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a circuit diagram of the sending apparatus.

Figs. 2A and 2B, taken together, form a circuit diagram of the receiving apparatus and the means controlled thereby.

Fig. 3 is a circuit diagram showing a modified form of sending apparatus.

Fig. 4 is a time chart showing the relative time of operation of various parts of the sending apparatus and the receiving apparatus during an operation in which the various parts of the receiving apparatus are being restored to normal or home position.

*General description*

Figure 2A:
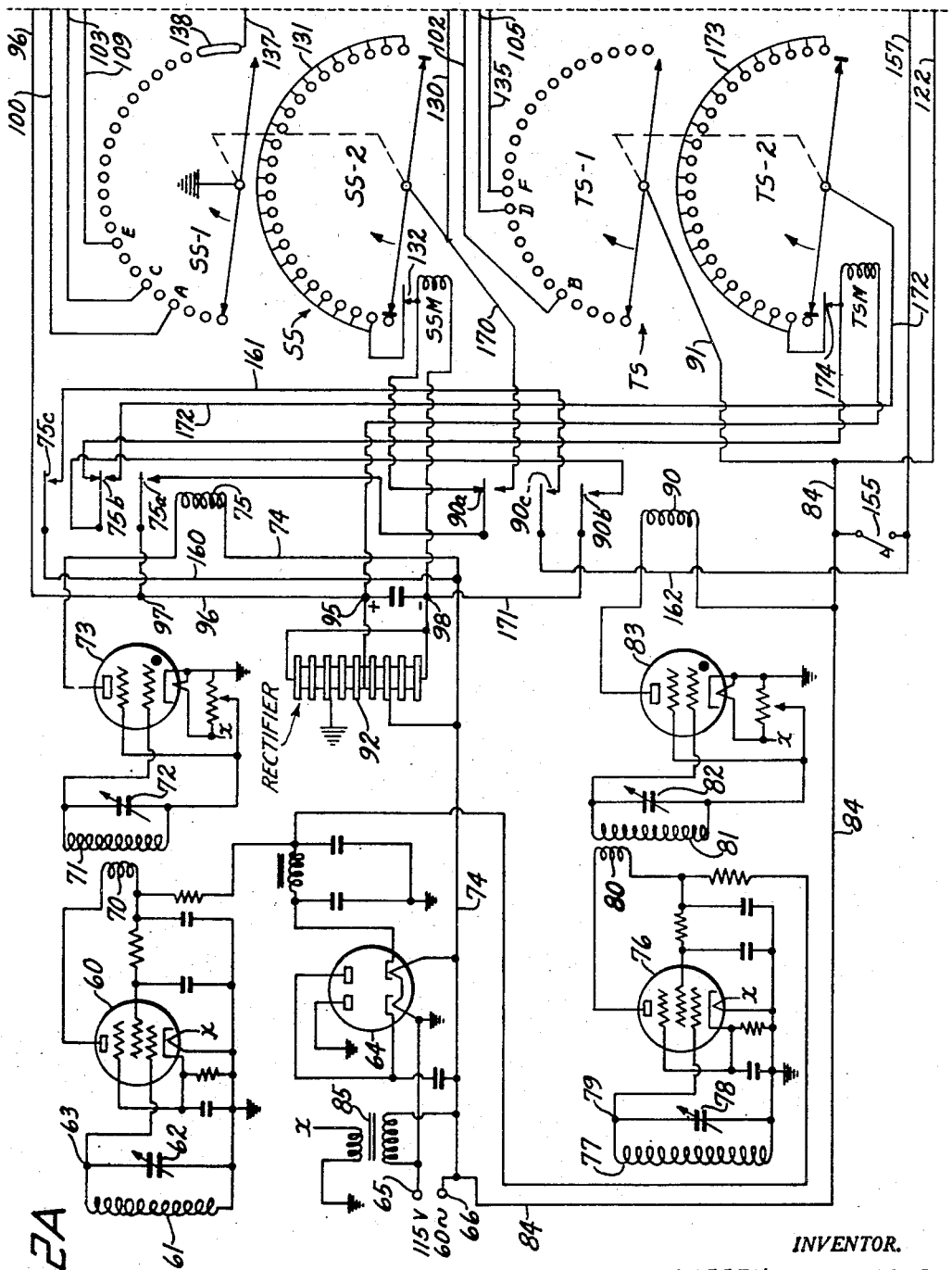

In the instant embodiment, the sending apparatus is adapted to be operated from the storage battery of an automobile, and the form shown in Fig. 1 consists of an electron-coupled oscillator and a controller which can control the oscillator to cause the oscillator to oscillate selectively at either of two selected frequencies to enable signals, made up of oscillations at either one or the other of these frequencies, to be generated.

The oscillator contains a vacuum tube which is provided with an inductance and capacitance in parallel in its grid circuit, the values of inductance and capacitance being so chosen that they will cause the oscillator to oscillate at a desired frequency $F_1$ to enable signals made up of oscillations at this frequency to be produced. When it is desired to cause the oscillator to oscillate at a different frequency, $F_2$, a second capacitor, which provides an additional capacitance, is connected across the inductance and in parallel with the other capacitance and enables signals made up of oscillations at this second frequency, $F_2$, to be generated.

The controller is a step-by-step operating switch which has one portion to control when the additional capacitance will be effective and thus controls the frequency at which the oscillator will operate, and has another portion to determine when the oscillator will operate.

At the end of an operation of the sending apparatus, the switch in the controller will be located in its normal or home position. When the switch is given its first step of movement, it connects the second capacitor to a vibrator which is operable to connect the additional capacitance across the inductance and the other capacitance and disconnect it therefrom at a high rate of speed. This causes the oscillator to produce signals made up of oscillations at $F_1$ and signals made up of oscillations at $F_2$ alternately in rapid succession. As long as the switch remains in the position which is one step out of home position, the rapidly alternating signals made up of oscillations at $F_1$ and $F_2$ will be generated. In the embodiment used to explain the invention, these signals will be distinctive from the signals of a signal sequence and will be effective to cause the receiving apparatus to operate and restore various parts thereof to their home or unoperated condition. This restoration of the parts of the receiving apparatus eliminates any error which might otherwise arise due to the unintentional operation of the receiving apparatus by stray signals or static, and insures that the receiving apparatus will respond properly only when the required signal sequence has been received.

After the switch has been in its first position long enough to allow the parts of the receiving apparatus to be restored, it can be given another step of movement to its second position, where a third portion of the switch takes over and causes the switch to operate automatically step by step forward until its resumes its home position. During this automatic operation of the switch, its first-named portion controls the oscillator to produce the signal sequence containing predetermined numbers of signals, each of which signals will contain oscillations at one or the other of the different selected frequencies.

In the instant embodiment, the normal signal sequence for causing an operation of the door-operating mechanism will consist of three signals, each of which is made up of oscillations at $F_1$, followed by four signals, each of which is made up of oscillations at $F_2$, then by two signals at $F_1$, six signals at $F_2$, and finally three signals at $F_1$. When it is dark and the lights of the automobile are lighted, means in the light circuit of the automobile will modify the control by the first- and second-named portions of the switch to cause an additional signal at $F_2$ to be transmitted following the normal signal sequence, which additional signal will be effective to control the light circuit in the garage to cause the lights in the garage to be lighted or extinguished as required.

If, after an operation of the door-operating mechanism has been initiated, it is desired to stop the operation of this mechanism, the stepping of the switch to its first position out of normal, or restoring position, will, as an incident to the restoring of the parts of the receiving apparatus, cause the operation of the mechanism to be interrupted immediately.

The sending apparatus and the receiving apparatus are coupled by either an electromagnetic field or an electrostatic field which radiates from a coil or antenna located at the front of the automobile each time a signal is generated.

The receiving apparatus operates from the usual 60-cycle alternating current at about 115 volts and contains one portion which is tuned to respond to oscillations at frequency $F_1$ and can receive signals made up of oscillations at this frequency, and contains another portion which is tuned to respond to oscillations at the other frequency, $F_2$, and can receive signals made up of oscillations at this frequency. Each portion of the receiving apparatus contains a signal-amplifying means, a thyratron, a relay, and a stepping switch, and, when a signal is received by a portion, it will fire the thyratron, which will cause its related relay to operate to close a circuit to the operating magnet of its related stepping switch. During the reception of either the normal signal sequence or the modified signal sequence, these circuits will cause the stepping switch related to the portion receiving the signal to make a step of movement for each signal received. These stepping switches, as they operate in response to the signals of the sequence, operate auxiliary control relays which, if the proper signal sequence is received, will cause the operation of the door-operating mechanism to be initiated.

When the signals at $F_1$ and the signals at $F_2$, which are sent alternately in rapid succession from the sending apparatus when the switch in the sending apparatus is in its first step from home position, are received, they will cause the relays in their related portions to operate. Due to the rapidity of the alternation of the signals and to the time lag in the release of the relays, relays in both portions will be operated at the same time, and, when both relays are thus operated, the circuits which are normally closed by the receipt of the signals of the sequence will not be closed, but, instead, restoring circuits will be closed to cause the stepping switches, if displaced from normal position, to be stepped back into their home position and to cause the auxiliary control relays and other portions of the receiving apparatus to be restored to their unoperated position.

In the embodiment used to explain the invention, the operation of both relays by the rapidly alternating signals is also utilized to control means to open the circuit to the door-operating mechanism to immediately arrest further movement of the door thereby.

The simultaneous operation of both relays in a restoring operation has been utilized to cause the stopping of the door-operating mechanism only because it is a convenient way to accomplish this result in the embodiment used to explain the invention. It is obvious that, if desired, the stopping function could be divorced from the restoring function and separate means, controlled by special signal combinations, could be provided to accomplish each of these functions.

When the automobile lights are on and the additional signal at $F_2$ is received, it will cause its related stepping switch to operate to a position where it can cause the operation of a garage light circuit controlling means to cause the lights to be lighted or extinguished as required.

The sending apparatus and the receiving apparatus can readily be changed to utilize different frequencies merely by changing either the inductance or the capacitance values, or both, in the grid circuit of the oscillator and by tuning the portions of the receiving apparatus to respond to these new frequencies. Similarly, the signal sequence can readily be changed merely by changing a few circuit connections in the switch of the controller in the sending apparatus, so that the additional capacitance can be made effective in a different desired sequence, and by making corresponding changes in the circuits between the stepping switches and the auxiliary relays of the receiving devices.

The details of the apparatus used in the exemplary embodiment of the novel remote control system to produce the above results will now be described.

*Detailed description*

The circuit diagram of one form which the novel sending apparatus may take is shown in Fig. 1, in which the usual storage battery of the automobile is shown at 10. The positive terminal of the battery 10 is connected to a normally open, manually operable switch 11, which, when operated to prepare the sending apparatus for operation, connects the positive battery terminal over conductor 12 to one side of a cathode heating element of a vacuum tube 13 of the oscillator and also connects the positive battery terminal to a vibrator power supply 14, which supplies potential to the anode of the tube 13.

The negative terminal of the battery 10 is connected to ground, and the circuits to the heating element and vibrator power supply, as well as to the various other elements of the sending apparatus, are completed by also connecting these elements to ground, as will be clear from Fig. 1.

The anode circuit contains a radio-frequency choke coil 15, a filter capacitor 16, and a bypass capacitor 17, one side of each of the capacitors being connected to ground.

The control grid of tube 13 is connected to a grid-leak resistor 18, which can be grounded in a manner to be explained hereinafter, and is also coupled through a capacitor 19 to point 20, to which one side of a coil 21 and a capacitor 22 are connected. The coil 21 and the capacitor 22 are connected in parallel by having their other sides connected to ground. The inductance of coil 21 and the capacitance of the capacitor 22 are so chosen that the coil 21 and the capacitor 22 will cause the oscillator to oscillate at a preselected frequency, $F_1$, when the grid is grounded through the grid-leak resistor 18.

The cathode of the tube 13 is connected to a point intermediate of the ends of the coil 21.

A capacitor 23 also has one side connected to point 20 and can be connected in parallel with the coil 21 and the capacitor 22 whenever its other side is grounded. The capacitance of capacitor 23 is so chosen that, when the capacitor 23 is connected in parallel with coil 21 and capacitor 22, it will change the constants of the control circuit of the oscillator and will cause the oscillator to oscillate at a different selected frequency, $F_2$. The manner in which the capacitor 23 can be connected to ground at desired times will be explained.

When frequencies $F_1$ and $F_2$, at which the oscillator oscillates, are in the lower range—for instance, about 150 kc. and 100 kc., respectively—and the sending apparatus and the receiving apparatus are to be coupled by an electromagnetic field, the coil 21 is located behind the usual radiator grill or at some other convenient part of the automobile and radiates these oscillations as they are generated. If frequencies $F_1$ and $F_2$ are in a higher range—for example, in the ultra high radio frequency range—and the sending apparatus and the receiving apparatus are to be coupled by an electrostatic field, then an antenna can be located behind the usual radiator grill or at some other convenient part of the automobile and can be connected to point 20 in the circuit of Fig. 1.

The controller includes a step-by-step operating switch having three portions, CS—1, CS—2, and CS—3. The switch is given its step-by-step movement by a switch-operating magnet CSM, which operates a wiper in each portion one step each time the magnet returns to unoperated condition after having been energized. The switch shown in the embodiment will return to home position after fifty steps of operation, but it is clear that switches which return home in smaller number of steps of operation could be used if smaller capacity were desired.

Portion CS—1 includes a double bank of contacts which are successively bridged by a wiper which is given a step-by-step clockwise movement, as viewed in Fig. 1, when the switch is operated.

Portions CS—2 and CS—3 include single banks of contacts which are traversed by related wipers which also are given a similar step-by-step clockwise movement when the switch is operated.

The wipers in the various portions are insulated from each other, but are connected for step-by-step movement in unison by the magnet CSM operating through a ratchet-and-pawl drive, as is well known in this type of switch. All three wipers are shown in their home positions in Fig. 1.

The portions CS—2 of the switch is effective to control the operation of the oscillator, the grid-leak resistor 18 of the oscillator being connected to certain of the contacts of portion CS—2, and, as the wiper, which is connected to ground, engages these contacts, the grid-leak resistor 18 is grounded to render the oscillator operable. In the instant embodiment, the resistor is normally connected to contacts in positions 1, 2, 4, 6, 8, 10, 12, 14, 16, 18, 20, 22, 24, 26, 28, 30, 32, 34, and 36 clockwise from normal or home position. Resistor 18 can also be connected to the contact in the thirty-eighth position from home position by a relay 30 in the light circuit of the automobile when the light switch 31 is closed and the lights, indicated generally at 32, are lighted and it is desired to send out a signal to control the garage light circuit.

The portion CS—1 of the switch controls the grounding of the capacitor 23 and thereby controls the frequency at which the oscillator will operate. This portion enables the sending of the required normal or modified signal sequences.

In the first position clockwise from home position, the wiper of portion CS—1 bridges a contact 33, which is connected to the capacitor 23, and a contact 34, which is connected to a blade 35 of a vibrator, which blade operates rapidly to alternately engage contacts 36 and 37, which are connected to ground. As the blade 35 passes between contact 36 and contact 37 (shown as the upper horizontal portion of the top line in the time chart in Fig. 4), it will disconnect the capacitor 23 from ground, and the oscillator will produce a signal made up of oscillations at $F_1$ (the full-line portion of the second line in the time chart in Fig. 4); however, when the blade 35 is in engagement with either contact 36 or contact 37 (shown as the lower horizontal portion of the top line in the time chart in Fig. 4), the capacitor 23 will be connected in parallel with the coil 21 and the capacitor 22, and the oscillator will produce a signal made up of oscillations at $F_2$ (the full-line portion of the third line in the time chart in Fig. 4).

The blade 35 is operated by a magnet 38, which has one side connected over a current-limiting resistor 39 and conductor 40 to the positive terminal of the battery 10 when the manually operable switch 11 is closed, and which has its other side directly connected to ground. A second blade 45, which is connected to blade 35 for operation therewith by the magnet 38, carries a contact which can short out magnet 38 when the magnet has been energized and has operated the blades. The blade 45 and the magnet 38 are so arranged that the magnet will operate the blades 35 and 45 at a rapid rate, as, for instance, at a frequency of about ninety-six operations per second, as shown in Fig. 4. This operation of the vibrator will cause alternating signals made up of oscillations at $F_1$ and at $F_2$ to be generated, each at about 192 per second, as shown in lines 2 and 3 of the chart, Fig. 4.

Figure 5:
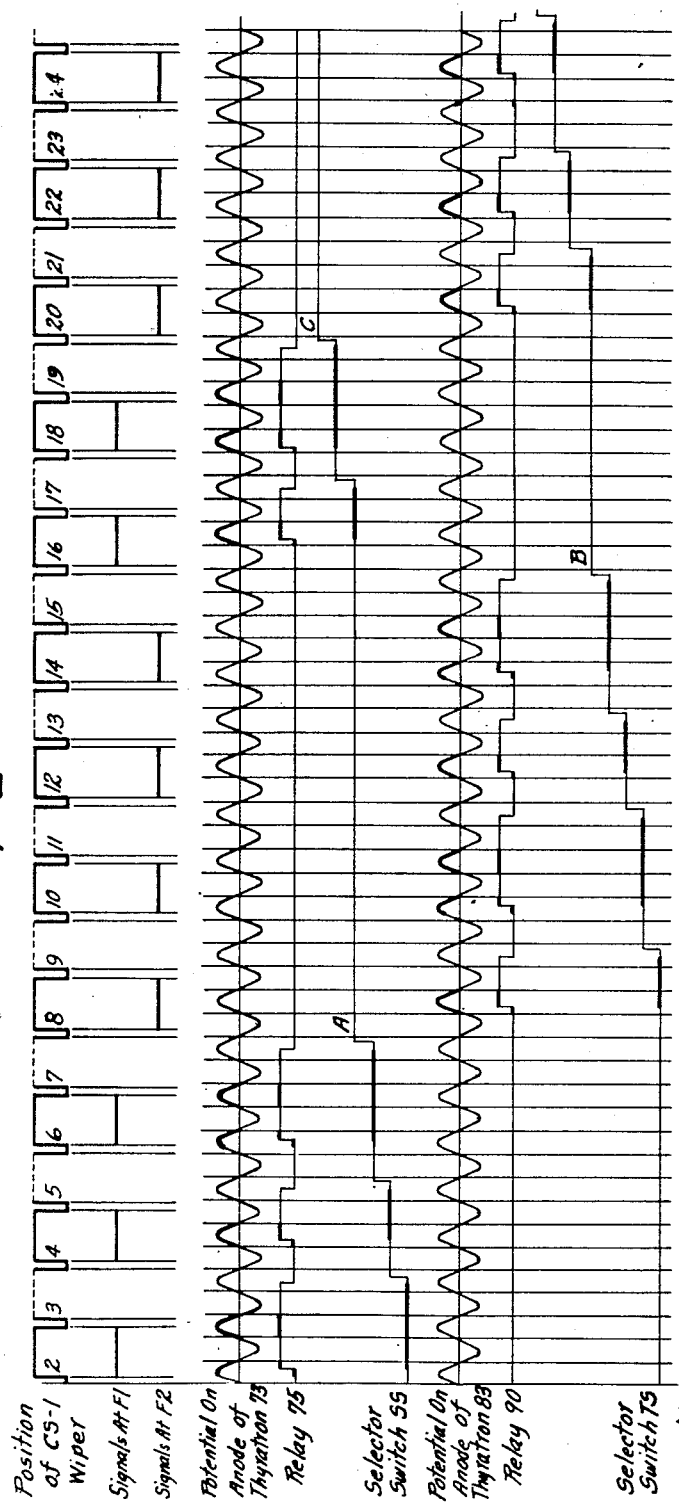
Fig. 5 is a time chart showing the relative time of operation of various parts of the sending apparatus and the receiving apparatus during the generation and reception of a portion of the normal signal sequence.

Contacts in positions 8, 10, 12, 14, 20, 22, 24, 26, 28, and 30 steps clockwise from home position in portion CS—1 (Fig. 1) are directly connected to the capacitor 23, and, as the wiper steps past these contacts, it will connect these contacts to other contacts which are directly connected to ground, thereby connecting capacitor 23 to ground, which places capacitor 23 in parallel with coil 21 and capacitor 22 and causes the oscillator to oscillate at frequency $F_2$ to generate signals, which are made up of oscillations at $F_2$, when the wiper is in any of these positions (line 3 on the chart of Fig. 5).

When the wiper is in positions 2, 4, 6, 16, 18, 32, 34, and 36 (Fig. 1), the capacitor 23 is not grounded and the oscillator will oscillate at frequency $F_1$ and will generate signals made up of oscillations at $F_1$ (line 2 on the chart of Fig. 5).

Accordingly, as the wiper traverses contacts in positions from 2 through 36, it will cause the required normal signal sequence to be generated.

When the lights of the automobile are lighted and the relay 30 (Fig. 1) is energized, it will connect the capacitor 23 to the contact in position 38 so that, when the wiper moves into engagement with this contact, it will connect this contact to a grounded contact and will cause the additional signal, made up of oscillations at $F_2$ in the modified signal sequence, to be generated.

The portion CS—3 of the switch controls the stepping of the switch. As seen from Fig. 1, the manually-operated switch 11, when operated, also connects positive terminal of the battery 10, over conductor 46, to one side of the switch-operating magnet CSM. The other side of the switch-operating magnet CSM is connected over a self-interrupter contact 47 to a conductor 48, which is connected directly to contacts in positions 2 to 49 clockwise from home position in portion CS—3, as seen in Fig. 1. Conductor 48, which is connected to the home position contact in portion CS—3, over a normally open, manually-operable "Stop and Restore" switch 49, is also connected to the contact in the first position clockwise (Fig. 1) from home position in portion CS—3 over a normally open manually-operable "Operate" switch 50. Whenever the circuit from the switch-operating magnet CSM is connected to a contact in the portion CS—3, it will be completed by the engagement of the wiper with that contact, because the wiper related to this bank of contacts is connected to ground.

Accordingly, after switch 11 has been operated to prepare the sending apparatus for operation, the operation of the "Stop and Restore" switch 49 will complete the circuit through the wiper in its home position and will cause the operating magnet CSM to be operated and move the wipers clockwise (Fig. 1), in all three portions, one step into their first position, where the wiper in the second portion CS—2 grounds the grid-leak resistor 18 to render the oscillator operable, and the wiper in the first portion CS—1 connects the additional capacitor to ground through the vibrator blade 35 to control the oscillator to cause signals made up of oscillations at $F_1$ and signals made up of oscillations at $F_2$ (lines 2 and 3 of the chart of Fig. 4) to be generated alternately in rapid succession, which signals cause various parts of the receiving apparatus to be restored to normal or home position and any uncompleted operation of the garage door operating mechanism to be interrupted.

When the wiper in portion CS—3 moves clockwise (Fig. 1) into its first position, it will open the circuit of the operating magnet CSM. After the sending apparatus has operated to send out signals which are made up of oscillations at $F_1$ and signals which are made up of oscillations at $F_2$, alternately in rapid succession, for a sufficient time to allow the parts of the receiving apparatus to be restored, the "Operate" switch 50 can be closed momentarily to complete the circuit to the operating magnet CSM to cause the wipers to be moved clockwise (Fig. 1) to their second position. Since contacts in positions 2 to 49 inclusive in the third portion CS—3 are connected to conductor 48, they will cause the operating magnet CSM to be operated repeatedly as the wiper is stepped thereover and will cause the switch to self-operate into its home position. This self-operation of the switch occurs at about fifty steps per second, and, during this portion of the operation of the switch, the signal sequence is sent out, as shown in lines 1, 2, and 3 of the chart of Fig. 5.

The operation of the above-described portion of the novel remote control system is as follows:

When the automobile is in the vicinity of or is approaching the garage, the sending apparatus, which is carried by the automobile, can be made ready for operation by closing the manually operable switch 11, which connects various parts of the sending apparatus to the positive terminal of the battery 10 of the automobile. Thereafter the "Stop and Restore" switch 49 can be operated to step the controller switch one step to cause signals at $F_1$ and signals at $F_2$ to be radiated alternately in rapid succession from the coil 21 when the frequencies $F_1$ and $F_2$ are in lower frequencies or from an antenna when the frequencies $F_1$ and $F_2$ are in the higher frequencies, which coil or antenna is conveniently located behind the usual radiator grill or at some other convenient part at the front of the automobile. The rapidly-alternating signals, which are made up of oscillations at $F_1$ and $F_2$, operate the receiving apparatus to restore the several parts thereof to home position, as will be explained hereinafter. When sufficient time has elapsed to enable the parts of the receiving apparatus to have been restored, the switch 49 can be opened and the "Operate" switch 50 can be operated to complete the circuit to the switch-operating magnet CSM, which will be energized and step the controller switch into its second position, where the portion CS—3 of the switch will take over and cause the switch to be stepped forward automatically to home position, during which stepping, portions CS—1 and CS—2 of the controller switch control the oscillator to generate the required signal sequence containing the preselected numbers of signals, which are made up of oscillations at frequencies $F_1$ or $F_2$, as shown in lines 1, 2, and 3 of the chart of Fig. 5.

It is obvious that the signal sequence could easily consist of signals made up of oscillations at any one of three or more selected frequencies merely by providing further additional capacitors, as 23, which could be connected to desired ones of the contacts of the portion CS—1 to be connected in parallel with the coil 21 and the capacitor 22, as in the case of the additional capacitor 23, to cause the oscillator to generate the additional selected frequencies.

The signal sequence also can readily be altered simply by changing the connections between the capacitor 23 and the contacts in the portion CS—1 and by making similar changes in the connections in the portion CS—2.

Figure 2B:
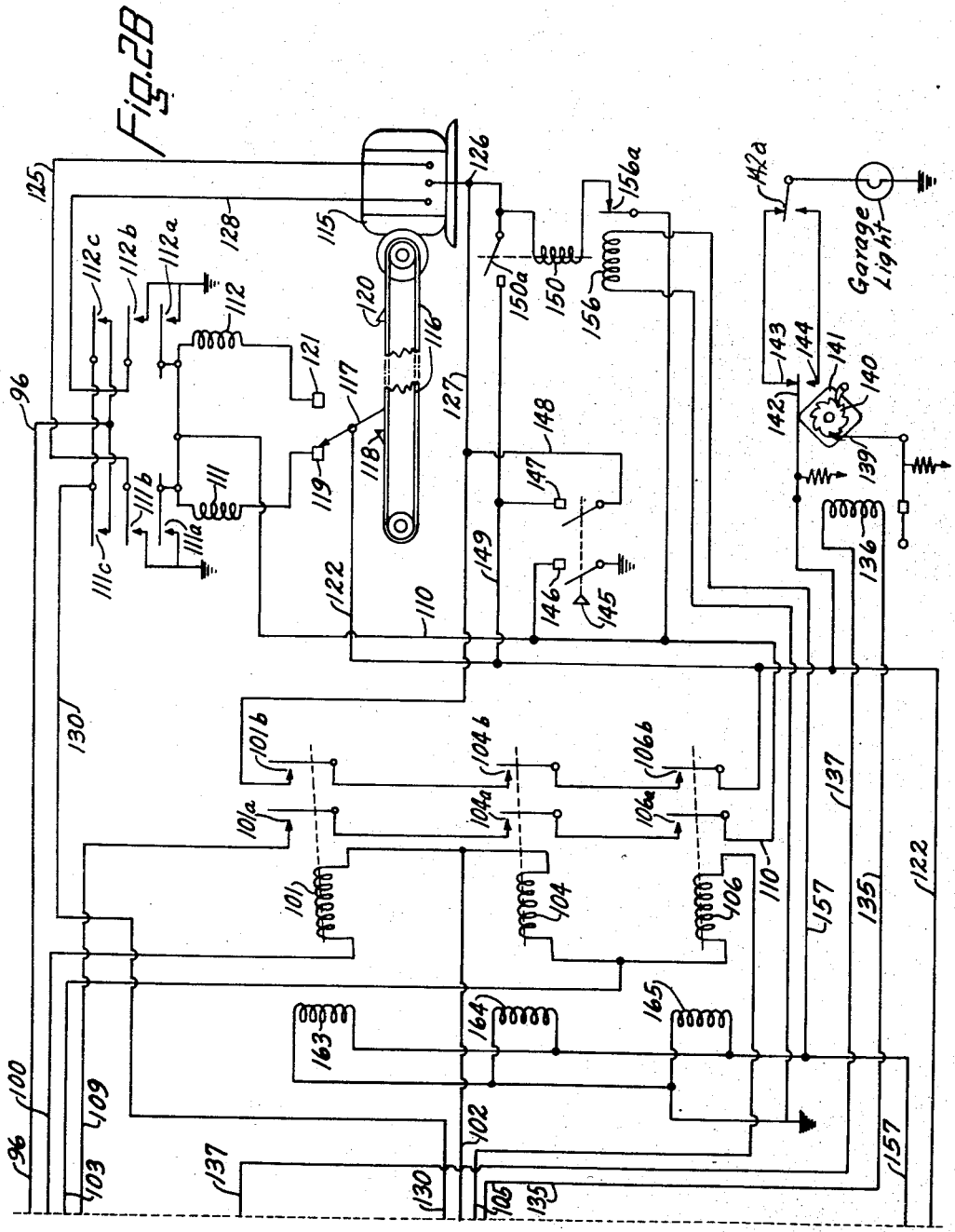

The circuit diagram for the receiving apparatus and for the closure-operating mechanism and light-controlling circuits controlled thereby is shown in Figs. 2A and 2B.

In the disclosed application of the novel remote control system to the remote control of garage door operating mechanism and garage-light circuits, the receiving apparatus, which is very small and compact, can be readily mounted in existing garages or in newly-constructed ones and can be operated by the usual power supply, as 60-cycle alternating current at about 115 volts.

One portion of the receiving apparatus is responsive only to signals sent thereto which are made up of oscillations at a frequency corresponding to frequency $F_1$ of the sending apparatus. This portion of the receiving apparatus contains a signal-amplifying vacuum tube 60 (Fig. 2A), having its control grid connected to a circuit which contains an inductance coil 61 and a capacitor 62 and which is so tuned that it will resonate at frequency $F_1$ and will allow tube 60 to become operable only when a signal made up of oscillations at frequency $F_1$ is received.

When the sending apparatus and the receiving apparatus are to be coupled by an electromagnetic field, the input means, which will be the coil 61, can be mounted on the garage, either inside or outside thereof, and can pick up the signals sent thereto. If an electrostatic coupling of the sending apparatus and the receiving apparatus is to be used, the input means will be a single straight wire antenna, which can be mounted on the garage, either inside or outside thereof. This antenna would be directly connected to point 63 in the tuned circuit, which is connected to the control grid of the tube 60.

Regardless of whether the input means is a coil or a straight wire antenna, it can readily be installed in existing construction without requiring extensive alteration to the construction and without requiring that the coil or antenna be placed along the driveway or approach or that the driveway or approach be torn up to receive the coil or antenna, as was necessary heretofore, as shown in the United States Patents Nos. 1,760,479 and 2,118,930, which issued, respectively, to H. D. Coleman and E. D. Lilja.

The anode of tube 60 derives its operating potential of about 250 volts D. C. from the output of a voltage-doubling rectifier tube 64, which is operated by the usual 60-cycle alternating current at a voltage of about 115 volts, which is supplied at terminals 65 and 66, terminal 65 being connected to ground.

Included in the circuit to the anode of tube 60 is a primary coil 70 of a transformer. The secondary coil 71 of the transformer is included in a circuit with the capacitor 72, which circuit is also tuned to resonate at frequency $F_1$ and is connected to the control grid of a gaseous electron-discharge tube or thyratron 73 to control the firing of the thyratron when signals at frequency $F_1$ are received. The signal-amplifying tube 60 and its coupling, through the tuned secondary of the transformer to the control grid of the thyratron, insure that the signals on the control grid of the thyratron 73 will be of sufficient strength to cause the thyratron to fire and become conducting each time a signal made up of oscillations at frequency $F_1$ is received while the thyratron has positive potential applied to its anode.

The anode of thyratron 73 is connected over conductor 74 to terminal 66 and is supplied with an alternating voltage of about 115 volts with respect to the grounded cathode of the thyratron. The voltage variations on the anode of thyratron 73 are shown in the fourth line from the top of the charts in Figs. 4 and 5. Whenever its anode is given a sufficient positive potential relative to its cathode, the thyratron 73 will be in operative condition, and, if a signal made up of oscillations at frequency $F_1$ is received at this time, the control grid will allow the thyratron to fire and become conducting. Once the thyratron becomes conducting, it will continue to conduct until it is extinguished, which extinguishing action occurs when the potential of its anode relative to its cathode either becomes too small to support conduction or becomes negative. In the charts of Figs. 4 and 5, the conducting condition of the thyratron 73 is indicated by making the anode-potential-indicating line heavy whenever conduction is taking place.

A relay 75 is included in the circuit to the anode of the thyratron 73 and receives current whenever conduction occurs in the thyratron. The operating characteristics of the relay are shown in the fifth lines of the charts in Figs. 4 and 5, in which lines the unoperated condition of the relay is shown by the lower horizontal portion of the line; the operated condition is shown by the upper horizontal portion of the line; and the time when current is flowing through the coil of the relay is shown by the heavy portion of the line. From these charts it is seen that the relay is much slower to release than to operate, and it is this slow-to-release characteristic which is utilized during restoring operations of the receiving apparatus, as will be explained more fully hereinafter.

In the receiving apparatus, there is another portion similar to the one just described but which is responsive only to signals which are made up of oscillations at a frequency corresponding to the frequency $F_2$ of the sending apparatus. This portion also contains a signal-amplifying vacuum tube 76 (Fig. 2A) having its control grid connected to a tuned circuit containing an inductance coil 77 and a capacitor 78 and tuned to resonate at frequency $F_2$. As in the case of coil 61, coil 77 can be the input means and can also be mounted on the garage to pick up signals if the sending apparatus and the receiving apparatus are coupled by an electromagnetic field. If the sending apparatus and the receiving apparatus are to be coupled by an electrostatic field, then the input means can be a single straight wire antenna, which can be mounted on the garage and can be connected to the tuned circuit at point 79.

Tube 76 also receives its anode potential from the voltage-doubling rectifier tube 64 and has the primary coil 80 of a transformer included in its anode potential supply circuit.

The secondary coil 81 of the transformer is included in a circuit with the capacitor 82, which circuit is also tuned to resonate at frequency $F_2$ and is connected to the control grid of a thyratron 83.

The anode of thyratron 83 is connected over conductor 84 to terminal 66 and is also supplied with an alternating voltage of about 115 volts with respect to the grounded cathode of this thyratron. Whenever its anode is given a sufficient positive potential relative to its cathode, the thyratron 83 will be in operative condition and can be fired and rendered conducting, if a signal made up of oscillations at frequency $F_2$ is received at this time. The voltage variations on the anode of thyratron 83 are shown in line 6 of the chart in Fig. 4 and in line 7 of the chart in Fig. 5, with the conduction in the thyratron 83 being shown by making the anode-potential-indicating line heavy whenever conduction is taking place.

A relay 90, which is similar to relay 75, is included in the circuit to the anode of the thyratron 83 and receives current whenever conduction occurs in the thyratron. The time of operation and release of this relay, as well as the times when the current is supplied thereto, are shown in the bottom line of the chart in Fig. 4 and in line 8 of the chart in Fig. 5.

The heater filaments of the vacuum tubes 60 and 76 and the thyratrons 73 and 83 each have one side, marked with an "$x$," connected to one side of a step-down transformer 85, also marked with an "$x$," and are supplied with heating current therefrom.

Because the voltage applied to the filaments of the thyratrons is also used to provide bias for their control grids to prevent conduction in the thyratrons unless signals are received, the filaments for the thyratrons are suitably connected to the transformer 85 so as to have a potential applied thereto which is 180 degrees out of phase with the potential applied to the anodes. The connections between the points $x$ at the heater filaments and the point $x$ at the transformer are direct conductive connections which are not shown in Fig. 2A.

The relays 75 and 90 jointly operate to control the operation of a pair of step-by-step operating selector switches of the type which is operated by a magnet and causes a step of operation to occur upon each release of the magnet.

One of the selector switches, SS, is related to the portion of the receiving apparatus which responds to signals which are made up of oscillations at frequency $F_1$. This first selector switch has a selector portion SS—1 (Fig. 2A), consisting of a bank of contacts and a wiper which is grounded and which can make contact with the contacts of the bank, one after another in succession, to set up circuit conditions to auxiliary relays after certain predetermined numbers of operations of the switch. This selector switch also has a homing portion SS—2, consisting of a bank of contacts and a wiper which engages the contacts one after another in succession as the switch is operated step by step. This portion, when rendered effective, can cause the switch to be stepped forward step by step automatically until the switch is in home position. The wipers of portions SS—1 and SS—2 of this selector switch are shown in their home position in Fig. 2A.

The wipers of portions SS—1 and SS—2 are insulated from each other but are connected together for rotary movement and are stepped past the contacts of their related banks by an operating magnet SSM, which is effective, through the usual magnet armature operated pawl-and-ratchet drive, to cause the wipers to make one step of movement upon each restoration of the magnet armature to unoperated condition after it has been operated.

The other selector switch, TS, is related to the portion of the receiving apparatus which responds to signals which are made up of oscillations at frequency $F_2$. This second selector switch has a selector portion TS—1, consisting of a bank of contacts and a wiper which is connected over conductors 91 and 84 to the ungrounded terminal 66 and which can make contact with the contacts of the bank one after another in succession to complete circuits through auxiliary control relays and the selector portion SS—1 of the first selector switch after certain predetermined numbers of operations of this second selector switch. This second selector switch also has a homing portion TS—2, consisting of a bank of contacts and a wiper which engages the contacts one after another in succession and is operable, when rendered effective, to cause the switch to be stepped forward step by step automatically until the switch is in its home position. The wipers of portions TS—1 and TS—2 of this selector switch are shown in their home positions in Fig. 2A.

The wipers of portions TS—1 and TS—2 are also insulated from each other but are connected for joint rotary movement to make one step of movement each time the armature of the operating magnet TSM for this switch is restored to unoperated condition after having been operated.

The operating potential for the operating magnets SSM and TSM for the selector switches is obtained from a rectifier 92 (Fig. 2A), which is connected between the alternating current potential supply conductor 74 and ground. When a signal which is made up of oscillations at frequency $F_1$ is received and relay 75 is operated, it will complete the following circuit to energize the operating magnet SSM: from point 95, over conductor 96, point 97, operated relay contact 75a, unoperated relay contact 90a, winding of operating magnet SSM and back to point 98. The potential between points 95 and 98 is about 125 volts D. C. and will cause magnet SSM to be energized when this circuit is closed. Magnet SSM will remain energized until relay 75 is released after the particular signal which is made up of oscillations at frequency $F_1$ has been received. Upon deenergization of magnet SSM, the wipers in portions SS—1 and SS—2 will make one step of movement clockwise (Fig. 2A). It will be noted that the above circuit to magnet SSM extends over unoperated contacts of relay 90 and would not have been completed by the operation of relay 75 if relay 90 had been energized and had moved contact 90a to its operated position before contact 75a was moved to its operated position.

In a similar manner, when a signal which is made up of oscillations at $F_2$ is received, relay 90 will be operated to complete the operating circuit for switch-operating magnet TSM if relay 75 has not been operated. The circuit completed by the operation of relay 90 extends from point 95, which is connected to the positive side of the rectifier 92, over the winding of magnet TSM, unoperated relay contact 75b, and operated relay contact 90b to point 98, which is connected to the negative side of the rectifier 92. If relay 75 had been energized and contact 75b had been operated when relay 90 was energized, relay 75 would have interrupted the energizing circuit to TSM.

Accordingly, in the normal operation of relay 75, it will complete the circuit to its related magnet SSM at contact 75a and will interrupt the circuit to magnet TSM at contact 75b, and similarly relay 90 will complete the circuit to its related magnet TSM at contact 90b and will interrupt the circuit to magnet SSM at contact 90a.

A clear understanding of the function of these selector switches will be had by considering their operation during the reception of the particular normal and modified signal sequences used in the instant embodiment and explained earlier herein. The operation of various parts of the receiving apparatus during the reception of a portion of these signal sequences is illustrated in the chart of Fig. 5.

After the receiving apparatus has been restored to normal or home position, the operation of the "Operate" switch 50 (Fig. 1) in the sending apparatus will initiate the automatic sending of either a normal or a modified signal sequence. As these signals are received by the receiving apparatus, the first three signals, which are made up of oscillations at frequency $F_1$, will, through signal-amplifying tube 60 and thyratron 73, cause relay 75 to operate three times to energize the operating magnet SSM three times to cause the wiper of portion SS—1 to make three steps of movement and engage the contact in the position marked "A," where it connects ground to conductor 100 (Figs. 2A and 2B), which is connected to one side of auxiliary control relay 101 (Fig. 2B). The next four signals of the sequence, which are made up of oscillations at frequency $F_2$, will, through the signal-amplifying tube 76 and the thyratron 83, cause relay 90 to operate four times to energize the operating magnet TSM of the other selector switch four times to cause the wiper of portion TS—1 to make four steps of movement and engage the contact in position marked "B," from which contact a conductor 102 (Figs. 2A and 2B) extends to the other side of the auxiliary control relay 101.

Since the wiper in portion TS—1 is connected to the ungrounded potential supply terminal 66 and the wiper in portion SS—1 is connected to ground when the wipers are in positions "B" and "A," respectively, they will complete the energizing circuit for the auxiliary control relay 101 and will cause this relay to operate.

The auxiliary control relay 101 is of the type in which its contacts, once operated, will remain locked in operated position even though the energizing circuit to the relay is interrupted and until a special restoring magnet is operated to unlock the contacts.

Upon receipt of three signals made up of oscillations at $F_1$ and four signals made up of oscillations at $F_2$, therefore, auxiliary control relay 101 will be operated, and its contacts 101a and 101b will be locked in operated position.

After four signals which are made up of oscillations at frequency $F_2$ have been received, the next two signals, which are made up of oscillations at frequency $F_1$, will cause the wiper of portion SS—1 to move two steps farther and engage contact in position marked "C," which contact is connected over conductor 103 to one side of a second auxiliary control relay 104, the other side of which relay is connected to conductor 102, extending to the contact in the position marked "B" in the portion TS—1 and upon which the wiper has remained. The movement of the wiper of portion SS—1 into engagement with the contact in the position marked "C" completes the energizing circuit for the second auxiliary control relay 104, whose contacts 104a and 104b operate and are locked in operated position.

Six signals which are made up of oscillations at $F_2$ follow the two signals which are made up of oscillations at $F_1$ and cause the wiper in portion TS—1 to move six steps farther into engagement with the contact in position marked "D," which contact is connected over conductor 105 (Figs. 2A and 2B) to one side of a third auxiliary relay 106, the other side of which relay is connected over conductor 103 to contact in position marked "C" in portion SS—1. Since the wiper in portion SS—1 does not move from the contact in position marked "C," while the wiper in portion TS—1 is moving six steps into engagement with the contact in position marked "D," the movement of the wiper of portion TS—1 into engagement with contact in position marked "D" will complete the energizing circuit for the third auxiliary control relay 106, whose contacts 106a and 106b operate and are locked in operated position.

At this stage of the operation of the receiving apparatus, the three auxiliary control relays, 101, 104, and 106, will have closed their contacts 101a and 101b, 104a and 104b, and 106a and 106b.

After the six signals which are made up of oscillations at frequency $F_2$ have been received, the last three signals of the normal signal sequence, which signals are made up of oscillations at frequency $F_1$, will cause the wiper in portion SS—1 to make three further steps of movement to engage the contact in position marked "E" and apply ground thereto. The contact in the position marked "E" is connected over conductor 109 (Figs. 2A and 2B), closed contacts 101a, 104a, and 106a, and conductor 110 to one side of relays 111 and 112, which initiate the operation of the door-operating mechanism when operating potential is supplied to the other side of their windings.

The door-operating mechanism may be of any suitable and well-known type, and, as shown schematically in Fig. 2B, includes a reversible motor 115 adapted to drive a door-actuating device 116.

Also included in the door-operating mechanism is a switching device 117, which is set by the actuating device to either of two positions, depending upon whether the door has been moved to closed or open position. As the actuating device 116 moves the door to closed position, suitable means thereon, as a lug 118, will engage the switching device 117, which is of the snap-switch type, and will move the switching device 117 into engagement with the contact 119, which is connected to relay 111. This is the condition shown in Fig. 2B. As the operating device 116 moves the door to open position, other means thereon, as lug 120, will engage the switching device and snap it over into engagement with contact 121, which is connected to relay 112.

The switching device 117 is connected over conductors 122 and 84 to the ungrounded terminal 66 (Fig. 2A), so that, with the door in closed position and the switching device 117 in the position shown in Fig. 2B, operating potential will be applied to relay 111. The circuit for relay 111 extends from terminal 66 (Fig. 2A), over conductors 84 and 122, switching device 117, contact 119, winding of relay 111, conductor 110, the contacts 106a, 104a, 101a, and conductor 109 to contact in position marked "E" in portion SS—1, which contact is connected to ground over the wiper which has moved into engagement therewith. Energization of relay 111 will initiate a door-opening operation.

With the door in open position, the switching device 117 will be in engagement with the contact 121, and the circuit to relay 112 will be completed in a similar manner when the wiper in portion SS—1 engages the contact in the position marked "E" after the switches 101a, 104a, and 106a have been closed. Energization of relay 112 will initiate a door-closing operation.

When relay 111 is energized, it closes three contacts, 111a, 111b, and 111c, of which contact 111a completes a holding circuit to ground, contact 111b grounds one side of one winding of the motor over conductor 125, which will cause the motor to operate in that direction which opens the door, and contact 111c completes a circuit to cause the portion SS—2 of the selector switch to be effective to cause the stepping of the selector switch forward to home position in a manner to be described later herein.

Motor 115 has operating potential applied thereto by being connected to the ungrounded terminal 66 (Fig. 2A), over point 126, conductor 127, contacts 101b, 104b, 106b, and conductors 122 and 84 and will operate when relay 111 grounds conductor 125 at contact 111b.

When relay 111 has initiated the operation of the motor 115 to open the door, the motor will, unless otherwise controlled, continue to drive the actuating device 116 until the lug 120 shifts the switching device 117 to open the circuit to relay 111, which becomes deenergized and removes ground from conductor 125 at contact 111b and thereby stops the motor.

The energization of relay 112 produces a result similar to that provided by relay 111; however, contact 112b applies ground to one side of another winding of the motor 115 over conductor 128, which causes the motor to run in the opposite direction and drive the actuating device 116 in the direction necessary to close the door. Contacts 112a and 112c perform functions similar to contacts 111a and 111c; namely, provide a holding circuit for the relay and complete a circuit to cause the portion SS—2 of the selector switch to be effective to step the switch forward into its home position.

It is clear from the above that, upon receipt of the proper normal signal sequence, the door-operating mechanism will be set in operation to open or close the garage door as required. It is also clear that the door-operating mechanism can be set in operation in response to a different signal sequence merely by changing the connections from the auxiliary control relays 101, 104, and 106 and conductor 109 from the contacts marked "A," "B," "C," "D," and "E" in Fig. 2B to other contacts as required by the different signal sequence. Accordingly, the receiving apparatus can readily be preset to respond to any desired signal sequence.

When either relay 111 or 112 is energized and closes contact 111c or 112c, it will render the homing portion SS—2 of the first selector switch operable to cause this switch to be stepped forward automatically until it reaches its home position. This is accomplished as follows. When contact 111c or 112c is closed, it connects a circuit from the positive side of the rectifier 92 (Fig. 2A) over points 95 and conductor 96 (Figs. 2A and 2B) to conductor 130 and wiper in portion SS—2.

It will be recalled that wipers in portions SS—1 and SS—2 move in unison, so that, when the wiper in portion SS—1 is in engagement with the contact in the position marked "E," the wiper in portion SS—2 will be in engagement with a contact in a corresponding position in its related bank of contacts. As seen in Fig. 2A, contacts in positions 2 through 24 in portion SS—2 are connected to a conductor 131, which is connected to one side of the winding of the operating magnet SSM over a normally closed contact 132, which is opened each time the operating magnet SSM is energized.

The circuit traced above from the positive side of the rectifier 92 over conductor 96, contacts 111c or 112c, and conductor 130 continues over the wiper and the remaining contacts of its related bank as the wiper engages them in succession, conductor 131, contact 132, winding of operating magnet SSM to point 98, which is connected to the negative side of the rectifier 92. This circuit will cause the operating magnet SSM to step the wipers forward until they reach their home positions as shown in Fig. 2A, in which position the contact of the bank is not connected to conductor 131 and stops the automatic operation of the switch.

This automatic homing operation of the selector switch moves the wiper in the portion SS—1 from the contact in position marked "E" and removes ground from conductor 109 to prevent an improper energization of relay 111 or 112 when the switching device 117 is snapped from one position to the other near the end of an operation of the actuating device 116.

The operation of the garage door operating mechanism can also be initiated by the momentary closing of a manually-operable "Start" key 145 (Fig. 2B) located at the garage or at any other suitable place, which key closes contact 146, which grounds the conductor 110 extending to relays 111 and 112, and also closes contact 147, which supplies operating potential to the motor 115 by connecting the motor to ungrounded terminal 66, over point 126, conductor 127, conductor 148, contact 147, and conductors 149, 122, and 84.

A holding relay 150 in a circuit between point 126 and conductor 110 in energized when the "Start" key grounds conductor 110 and also applies operating potential to point 126. Relay 150 at its contact 150a connects point 126 directly to conductor 149 to by-pass the contact 147 to maintain operating potential on the motor after the key 145 has been released.

A manually-operable "Stop" key 155 (Fig. 2A), located at the garage or in any other suitable place, when operated, connects operating potential to a conductor 157 (Figs. 2A and 2B), which is connected to one side of a release relay 156 (Fig. 2B), the other side of which relay is connected to ground. When the "Stop" key 155 is operated, relay 156 will operate and open contact 156a in the circuit of relay 150 to cause relay 150 to be deenergized to open contact 150a in the potential-supplying circuit for the motor 115, thereby stopping the motor and the garage door operating mechanism at any point in its operation.

As explained earlier herein, the sending apparatus in the automobile will send out a modified signal sequence containing the signals of a normal sequence plus an additional signal made up of oscillations at frequency $F_2$ when the sending apparatus is operated and the lights of the automobile are lighted. When this occurs, the signals corresponding to the normal signal sequence will cause the door-operating mechanism to operate, and the additional signal will cause the wiper in portion TS—1 to move one step farther to engage the contact in position marked "F" and place operating potential on this contact. Conductor 135 (Figs. 2A and 2B) connects the contact in the position marked "F" to one side of a garage light circuit controlling relay 136 (Fig. 2B), the other side of which relay is connected over conductor 137 (Figs. 2A and 2B) to a contact 138 in the portion SS—1 and is connected to ground when the wiper in portion SS—1 engages contact 138 near the end of the homing operation of this selector switch. This causes the relay 136 to be energized shortly after the operation of the door-operating mechanism has been initiated.

When relay 136 operates, it is effective through a pawl 139 and a ratchet 140 to operate the cam 141 one step to control the shifting of the blade 142 to selectively engage contacts 143 or 144 in the garage light circuit. The blade 142 and the contacts 143 and 144 form one switch in the well-known three-way circuit used to control the circuit to the garage lights and enable the control from the automobile to cause the lights to be either turned off or on as required. The light circuit also includes a manually-operable switch 142a.

As explained earlier herein, the sending apparatus, with the controller in its first position out of normal or home position, sends out signals made up of oscillations at $F_1$ and signals made up of oscillations at $F_2$, which signals are alternated rapidly in succession. These rapidly alternating signals operate the receiving apparatus to restore various parts thereof to home or normal position before either the normal or the modified signal sequence is sent to the receiving apparatus. This restoration of the parts of the receiving apparatus will eleminate any erroneous setting of the receiving apparatus which might have been due to unwanted reception of stray signals or static and will insure that the receiving apparatus will respond properly to the signals of the signal sequence.

As shown in Fig. 4, at least one signal which is made up of oscillations at frequency $F_1$ and one signal which is made up of oscillations at frequency $F_2$ will be received in the positive half of each cycle of alternating potential applied to the anodes of thyratrons 73 and 83, causing both thyratrons to be fired in each cycle. As the thyratrons 73 and 83 conduct, they energize their respective relays 75 and 90, causing both relays to be operated at about the same time.

Even though the thyratrons 73 and 83 are extinguished and current flow therethrough is interrupted during the negative half of each cycle of alternating potential applied to their anodes, the relays 75 and 90 will remain operated because the time required for the armatures of the relays to leave their operated position, after current is interrupted to their winding, exceeds that time during which potential on the anodes is negative. This time lag in the restoration of the relays is shown in lines 5 and 8 in the chart of Fig. 5, in which lines the operated condition of the relays is shown by the upper horizontal portion of the lines; the unoperated condition of the relays is shown by the lower horizontal portion of the lines; and the time current is on the relays is shown by the heavy portion of the lines.

Returning to Fig. 4, the operation of relays 75 and 90 during the restoring operation of the receiving apparatus is shown in lines 5 and 7 of the chart, which lines show that the two relays are operated and remain operated during the entire restoring operation because current is reapplied to the relays before they have had time to restore to unoperated position.

With both relays 75 and 90 operated at the same time, a circuit is completed to one side of restoring relays 156, 163, 164, and 165 from conductor 74 (Fig. 2A), over conductor 160, operated contact 75c, conductor 161, operated contact 90c, conductor 162, and conductor 157. This circuit applies operating potential to one side of the restoring relays 156, 163, 164, and 165 (Fig. 2B), which relays have their other sides connected to ground and become energized when potential is applied by this circuit over contacts 75c and 90c. Relay 156 interrupts the circuit to the holding relay 150 at contact 156a, and relay 150 opens the potential supplying circuit to the motor 115 at contact 150a. Relays 163, 164, and 165, when operated, unlock contacts 101a and 101b, 104a and 104b, and 106a and 106b of the auxiliary control relays 101, 104, and 106, allowing these contacts to open and interrupt the circuits which extend thereover.

This interruption of the circuits over contacts 101a and 101b, 104a and 104b, 106a and 106b, and over contacts 150a will stop the operation of the motor 115 and will arrest any further movement of the door, thus enabling the operation of the door-operating mechanism to be arrested by a control sent from the automobile.

While the energization of the restoring relays 156, 163, 164, and 165, which cause the operation of the door-operating mechanism to be interrupted, is shown as a part of the resetting operation, it is obvious that the circuit to these relays could be completed by some other signals instead of by the special restoring signals if the interruption of a door operation were to be divorced from the restoring operation.

The simultaneous operation of relays 75 and 90 also completes circuits to the homing portions SS—2 and TS—2 to cause the selector switches to be stepped forward to their home positions.

The circuit to the homing portion SS—2 extends from the positive side of the rectifier 92 (Fig. 2A) over point 95, conductor 96, point 97, operated contact 75a, operated contact 90a, and conductor 170 to the wiper of portion SS—2. If this selector switch is not in home position, the wiper will be engaged with one of the contacts connected to conductor 131, and the circuit will continue over contact 132 and the winding of operating magnet SSM to point 98, which is connected to the negative side of the rectifier 92. This circuit will cause the wipers SS—1 and SS—2 to be stepped forward into their home position, where wiper in portion SS—2 engages a contact which is not connected to conductor 131 and stops further movement of the wipers. If this selector switch is in home position as a result of a previous operation of relay 111 or 112, the circuit over operated contacts 75a and 90a will have no effect thereon.

The circuit to the homing portion TS—2 extends from the negative side of the rectifier 92, over point 98, conductor 171, operated contact 90b, operated contact 75b, and conductor 172 to the wiper of portion TS—2. If the selector switch is not in home position, the wiper will be in engagement with one of the contacts connected to conductor 173, and the circuit will continue over contact 174, the winding of operating magnet TSM to point 95, which is connected to the positive side of the rectifier 92. This circuit will cause wipers in portions TS—1 and TS—2 to be operated step by step until they engage the contacts in home position, the contact in home position in portion TS—2, not being connected to conductor 173, interrupting the homing circuit to operating magnet TSM.

It is clear from the above description that, when the signals which are made up of oscillations at $F_1$ and the signals which are made up of oscillations at $F_2$ are received alternately in rapid succession, relays 75 and 90 will be operated concurrently and will complete circuits to the restoring relays 156, 163, 164, and 165 and to the homing portions SS—2 and TS—2 of the selector switches, to interrupt any operation of the door-operating mechanism which might be taking place, and to restore the various parts of the receiving apparatus to home or normal position in readiness to receive the signals in the normal signal sequence or in the modified signal sequence, the signals in the normal signal sequence causing an operation of the door-operating mechanism to take place, and the signals in the modified signal sequence also causing an operation of the door-operating mechanism and in addition thereto causing an operation of the garage light circuit.

It is clear that the circuit conditions which are set up in the receiving apparatus upon the receipt of the normal signal sequence or the modified signal sequence to cause relay 111 or 112 to operate and initiate any operation of the garage-door-operating mechanism in the embodiment given to illustrate the invention could readily be used to either operate or control the operation of some other mechanism, and that the additional signals of the modified signal sequence, which control the operation of the garage light circuit controlling means, could operate or control the operation of some other desirable mechanism.

Fig. 3 shows a modified form of sending apparatus which uses the shock excitation of a resonant circuit to produce the desired signals and which can be controlled to produce oscillations at different frequencies as $F_1$ and $F_2$.

The signal generator includes a resonant circuit made up of an inductance coil 21a and capacitor 22a, which circuit is tuned to oscillate and generate signals which are made up of oscillations at frequency $F_1$, and also includes a second capacitor 23a, which can be connected across the coil 21a and the capacitor 22a to change the resonance of the circuit and cause the circuit to oscillate at frequency $F_2$ to produce signals which are made up of oscillations at $F_2$. In order to cause the resonant circuit to oscillate, it is excited by a magnetic field set up in a coil 180, which field influences the coil 21a.

Coil 180 is connected in series with a capacitor 181 across a spark gap 182. The spark gap 182 is connected across the high-voltage coil 183 of a transformer which is capable of supplying alternating operating potential to this circuit. Radio frequency choke coils 184 and 185 are provided to protect the coil 183. When the voltage builds up in the coil 183, it will charge the capacitor 181, and, when the gap 182 breaks down, capacitor 181 will also be discharged therethrough and with coil 180 will constitute a resonant circuit having a low decrement.

As the current flows in the coil 180, a field will be set up which shock excites the coil 21a and causes the signal-generating circuit to oscillate to produce a signal made up of oscillations at $F_1$ or $F_2$, depending upon whether or not capacitor 23a is in the circuit.

The signals generated in this signal-generating circuit will be radiated from coil 21a directly if the frequencies are in the lower range or from a straight wire antenna connected to point 20a, if the frequencies are in the higher range.

The circuit to the low-voltage coil 186 of the transformer will be prepared when the preparing switch 11a is closed to connect one side of the coil to the positive terminal of battery 10a. Negative terminal of battery 10a is grounded, and the circuit to coil 186 will be completed from the other side of the coil, over normally closed contact 187 and contacts in portion CS—2a when the grounded wiper in this portion is moved into engagement therewith.

When the circuit to coil 186 is completed and current flows through the coil, the resulting magnetic field will cause contact 187 to be opened to interrupt the current flow, causing the field to decay and allowing the contact 187 to reclose. This building up and decay of the field resulting from the intermittent interruption of current in coil 186 by switch 187 will induce the alternating potential in the high-voltage coil 183, which causes the gap 182 to break down, and enables coil 180 to cause the signal-generating circuit to oscillate and produce the required signal.

The wiper in portion CS—2a of the controller switch will ground contacts in positions 1, 2, 4, 6, 8, 10, 12, 14, 16, 18, 20, 22, 24, 26, 28, 30, 32, 34, and 36 clockwise from the normal or home position, shown in Fig. 3, and will cause the signal-generating means to oscillate whenever the wiper is on any one of these contacts.

The wiper in portion CS—1a grounds capacitor 23a through the vibrator blade 35a in the first position clockwise from normal to cause signals made up of oscillations at frequency $F_1$ and signals made up of oscillations at frequency $F_2$ to be generated alternately in rapid succession and grounds the capacitor directly in positions 8, 10, 12, 14, 20, 22, 24, 26, 28, and 30 steps clockwise from home position to cause signals made up of oscillations at frequency $F_2$ to be generated whenever the wiper is in any one of these positions.

The wiper in portion CS—3a, in conjunction with switches 49a and 50a, controls the operation magnet CSMa to cause the stepping of the switch through its cycle of operation in the same manner as the wiper CS—3, and switches 49 and 50 control the magnet CSM to cause stepping of the switch during the sending operation, as explained in connection with Fig. 1.

The light circuit of the automobile contains a relay 30a, which enables wipers in portions CS—1a and CS—2a to ground capacitor 23a and coil 186, respectively, in the thirty-eighth position of the switch to cause the extra signal, made up of oscillations at frequency $F_2$, to be sent out to control the garage light circuit.

The type of sending apparatus shown in Fig. 3, therefore, can generate signals which will cause the operation of the door-operating mechanism to be interrupted and the receiving apparatus to be restored to normal or home position, can generate the normal signal sequence to cause an operation of the garage door operating mechanism, and can generate the modified signal sequence to cause an operation of the garage door operating mechanism and to control the operation of the garage light circuit.

*Summary*

From the above description, it is seen that the novel remote control system utilizes signals made up of oscillations at any one of a plurality of different preselected frequencies, to form a signal sequence, which sequence is made up of selected numbers of signals made up of oscillations at various ones of these frequencies in any desired selected order. Because the signal sequence can be varied as to the frequencies used, as to the order in which the signals made up of oscillations at respective frequencies are used, and as to the numbers of signals used, the system is very flexible and is capable of being operated in a large number of separate installations, each installation generating and responding to its own individual signal sequence to cause some other operation to take place under remote control.

The novel apparatus utilized in the novel remote control system has the further advantage that it can readily be changed to generate and respond to a different signal sequence merely by changing a few simple electrical connections in the sending and receiving apparatus and without any mechanical change in the structure of either apparatus.

Since the means in the receiving apparatus which control or cause an operation to take place when the proper sequence is received are operated by the signals of the sequence, there is no necessity of synchronizing the sending apparatus and the receiving apparatus during the generation and reception of the signal sequence.

The novel system enables a signal of a particular sort to be sent to the receiving apparatus to restore the receiving apparatus to home or normal position to clear the receiving apparatus of any setting remaining from a previous operation or caused by undesired actuation of the receiving apparatus by static or stray signals, and thus insures that the receiving apparatus will be in the proper condition when the signal sequence is sent thereto and will cause the proper operation of some other means when the signal sequence has been received.

The novel control system has the further advantage that it can enable the sending apparatus, by the sending of appropriate signals, to cause the interruption of an operation which has been initiated by the reception of a signal sequence previously sent from the sending apparatus.

When the above novel control system is applied to the opening of garage doors from automobiles, the apparatus has the advantage that it can be installed readily in existing construction, and, because the antenna or receiving coil can be mounted at the garage, either inside or outside thereof, there is no necessity for the tearing up of driveways or approaches to the garage in order that the antenna may be placed therein; neither is there any necessity for stringing an antenna along the driveway.

The claims in this application are drawn to the remote control system. Claims to the signal-transmitting apparatus, per se, are in divisional application Serial Number 216,228, filed March 17, 1951. Claims to the receiving apparatus, per se, are in divisional application Serial Number 216,229, filed March 17, 1951.

While the form of the invention shown and described herein is admirably adapted to fulfill the objects primarily stated, it is to be understood that it is not intended to confine the invention to the one form or embodiment disclosed herein, for the novel remote control system is susceptible of embodiment in various forms all coming within the scope of the claims which follow.

What is claimed is:

1. In a remote control system for controlling the operation of a closure for a structure from a vehicle, the combination of a closure-operating mechanism mounted in said structure; a receiving apparatus including means displaceable from a normal home position in response to signals which are made up of oscillations at one frequency and signals which are made up of oscillations at another frequency and effective, upon receipt of a preassigned signal sequence containing predetermined numbers and combinations of the different kinds of signals in a predetermined sequence, to initiate an operation of said closure-operating mechanism, and also including means for restoring the displaceable means to normal position in response to said two types of signals when said two types of signals are received alternately in rapid succession; and a sending apparatus carried by the vehicle, said sending apparatus including oscillating means for producing oscillations selectively at either of said two frequencies to generate and transmit the two types of signals, also including normally inoperable control means, which, when operable, controls the oscillating means to produce the two types of signals alternately in rapid succession, and including manually controlled means for first rendering the normally inoperable means operable, to cause rapidly-alternating signals to be generated and transmitted to cause the restoring means in the receiving apparatus to be operated to restore the displaceable means to home position, said manually controlled means thereafter directly controlling the oscillating means to cause the signals of the preassigned signal sequence to be generated and transmitted to cause an operation of the closure-operating mechanism, the restoring of the displaceable means in the receiving apparatus under control of signals sent from the vehicle immediately before the preassigned signal sequence is sent from the vehicle, erasing any improper displacement of the displaceable means and insuring that these means will operate properly and will initiate an operation of the closure-operating mechanism when the preassigned signal sequence is received.

2. In a remote control system for controlling the operation of a closure for a structure from a vehicle, the combination of a closure-operating mechanism mounted in said structure; a receiving apparatus including means operable in response to a signal sequence containing a predetermined combination of signals, to cause an operation of the closure-operating mechanism, and including means operable in response to a signal sequence containing a different combination of signals, to interrupt the operation of said closure-operating mechanism; and a sending apparatus carried by said vehicle, said sending apparatus including an oscillating means, including means for controlling the oscillating means to generate and transmit signals one after another to form the signal sequence containing said predetermined combination of signals for causing the operation of the closure-operating mechanism, and also including means, operable at will, for controlling the oscillating means to generate and transmit signals which form the signal sequence containing said different combination of signals for causing the interruption of the operation of the closure-operating mechanism, said controlling means enabling both initiation and interruption of the operation of the closure-operating means to be effected from the vehicle.

3. In a remote control system for controlling the operation of a closure for a structure from a vehicle, the combination of a closure-operating mechanism mounted in said structure; a receiving apparatus mounted in said structure, said receiving apparatus including means operable in response to signals which are made up of oscillations at one frequency and signals which are made up of oscillations at another frequency and effective upon receipt of a signal sequence containing predetermined numbers and combinations of the different kinds of signals in a predetermined sequence, to initiate an operation of said closure-operating mechanism, and also including means operable in response to said two types of signals and effective, when the two types of signals are received alternately in rapid succession, to control the closure-operating mechanism and interrupt an operation thereof; and a sending apparatus carried by said vehicle, said sending apparatus including an oscillator for producing oscillations selectively at either of said two frequencies, including means to control the oscillator to cause said first-mentioned signal sequence to be generated and transmitted, and also including means, operable at will, to control the oscillator to generate and transmit the two types of signals alternately in rapid succession, said sending apparatus, therefore, enabling both the initiation and the interruption of the operation of the closure-operating mechanism to be effected from the vehicle.

4. In a remote control system for controlling the operation of a closure for a structure from a vehicle, the combination of a closure-operating mechanism mounted in said structure; a sending apparatus mounted in said vehicle, said sending apparatus including an oscillator, including means for controlling the oscillator to generate and transmit signals one after another to form a signal sequence for causing an operation of the closure-operating mechanism, said signal sequence containing a predetermined combination of signals in which certain signals are made up of oscillations at one frequency and the remaining signals are made up of oscillations at another frequency, and including means, operable at will, for controlling the oscillator to generate and transmit signals which form a signal sequence containing a different combination of the above types of signals, for interrupting an operation of the closure-operating mechanism if it has been started; and receiving apparatus mounted in said structure, said receiving apparatus including input means mounted on the structure, including means controlled by the input means and operable in response to the signals to be effective, upon receipt of the predetermined combination of signals of said first-mentioned signal sequence, to initiate an operation of said mechanism, and also including means controlled by the input means and operable in response to the signals to be effective, upon receipt of said different combination of signals, to interrupt the operation of said closure-operating mechanism.

5. In a remote control system for controlling the operation of a closure for a structure from a vehicle, the combination of a closure-operating mechanism mounted in the structure; receiving apparatus mounted in the structure; said receiving apparatus including means displaceable from a normal home position in response to various combinations of signals to control the closure-operating mechanism to cause an operation thereof if a preassigned combination of signals is received, and also including means for restoring the displaceable means to normal position in response to a different combination of signals; and a sending apparatus carried by the vehicle, said sending apparatus including an oscillating means, including means to control the oscillating means to generate and transmit the different combination of signals to the receiving apparatus, and also including means operable at will to control the oscillating means to generate and transmit said preassigned combination of signals to said receiving apparatus, said means which controls the oscillating means to produce said different combination of signals enabling the receiving apparatus to be restored by signals sent from the vehicle, and if operated immediately before the other control means for the oscillating means, causing the displaceable means in the receiving apparatus to be restored to their normal home position and thereby insuring that the displaceable means will be operated correctly and cause the closure-operating mechanism to operate when said preassigned combination of signals is received.

6. In a flexible remote control system for controlling the operation of a closure for a structure from a vehicle, the combination of a sending apparatus carried by the vehicle, said sending apparatus including an electronic oscillating means for generating and transmitting oscillations selectively at either of two preselected frequencies, from which oscillations at one of said preselected frequencies, one type of signal is constituted, and from which oscillations at the other of said preselected frequencies, another type of signal is constituted, including a controlling switch having banks of contacts and related wipers movable step by step over contacts in their related banks of contacts, and including circuits selectively connected to contacts of the banks and to the oscillating means to enable the switch to control when and at which of the frequencies the oscillating means will oscillate, said switch, together with the particular connections used, controlling the oscillating means to generate and transmit a preassigned signal sequence containing said two kinds of signals, said signal sequence being made up of a plurality of groups of signals containing various predetermined numbers of signals of said one type or said other type, with the type of signals for successive groups of signals alternating until the preassigned signal sequence is completed; a closure-operating mechanism; and a receiving apparatus mounted in the structure, said receiving apparatus including one portion which contains means responsive to oscillations at said one frequency to respond to signals of said one type and contains a switch having a bank of contacts and a wiper which is given a step of movement relative to the contacts, under control of the means responsive to oscillations at said one frequency, to engage a different contact each time a signal of said one type is received and engage a different predetermined contact after each group of signals of said one type has been received, and including another portion which contains means responsive to oscillations at said other frequency to respond to signals of said other type and contains a switch having a bank of contacts and a wiper which is given a step of movement relative to the contacts, under control of the means responsive to oscillations at said other frequency, to engage a different contact each time a signal of said other type is received and engage a different predetermined contact after each group of signals of said other type has been received, and said receiving apparatus also including an auxiliary control means which contains a plurality of auxiliary control relays connected to predetermined contacts in both switches so that one of the auxiliary control relays will be operated if the number of signals in the first and second groups of signals have been received and have caused the wipers to engage the contacts to which it is connected in both portions, and others of the auxiliary control relays will be operated during the reception of the signal sequence when further predetermined numbers of signals of the various types are received in subsequent groups and the wipers engage the other predetermined contacts to which various ones of the auxiliary control relays are connected, and containing a circuit which is completed over the operated auxiliary control relays if the preassigned signal sequence is received and which, when completed, causes the operation of the closure-operating mechanism, said sending and receiving apparatus being readily adapted to generate and respond to a wide variety of preassigned signal sequences obtained by varying the preselected frequencies used, by varying connections between the switch and the oscillating means in the sending apparatus and correspondingly varying the connection between the switches and the auxiliary control means in the receiving apparatus to vary the number of signals in the various groups, or by varying both the connections and the preselected frequencies used, thus enabling similar sending and receiving apparatus to control the operation of a large number of closure-operating mechanisms, using an individual preassigned signal sequence in the control of each closure-operating mechanism.

7. In a remote control system, the combination of a sending apparatus which includes an oscillating means for producing oscillations at either of two preselected frequencies, and includes a control means for controlling the oscillating means to cause it to oscillate for a predetermined period at one of said frequencies to produce a signal of one type which is made up of oscillations at said frequency and for controlling the oscillating means to cause it to oscillate for a similar predetermined period at the other of said frequencies to produce a signal of another type which is made up of oscillations at the other of said frequencies, said controlling means, by controlling the oscillating means selectively, being effective to cause a particular signal sequence made up of a plurality of groups of signals to be generated and sent from the sending apparatus, each group of signals containing a predetermined number of one or the other of the different types of signals, with the type of signals in succeeding groups alternating in a predetermined combinational sequence; a receiving apparatus which includes one portion which contains electronic means responsive to oscillations at said one frequency and contains an element which is given an increment of operation under control of the electronic means whenever a signal of said one type in any group is received, and also includes another portion which contains electronic means responsive to oscillations at the other of the said frequencies and contains an element which is given one increment of operation under control of the second-mentioned electronic means whenever a signal of said other type in any group is received; and means jointly controlled by the elements in both portions of the receiving apparatus as the several groups of signals are received during the reception of a signal sequence for completing a circuit to effect a desired control or operation if the preassigned signal sequence has been received.

8. In a remote control system, the combination of a sending apparatus including oscillating means for producing oscillations selectively at either of two preselected frequencies, from which oscillations at one of said preselected frequencies, one type of signal is constituted, and from which oscillations at the other of said preselected frequencies, another type of signal is constituted, and including a control means for controlling the oscillating means to produce the signals of a sequence by controlling the oscillating means to oscillate for predetermined intervals necessary to produce the signals and by controlling selectively at which of the frequencies the oscillating means will oscillate, said control means, by its control over the oscillating means, enabling a preassigned signal sequence containing said two types of signals to be generated and transmitted, said signal sequence being made up of a plurality of groups of various predetermined numbers of signals of said one type and said other type with the type of signals for successive groups of signals alternating until the preassigned signal sequence is completed; a receiving apparatus including a portion which responds to oscillations at said one frequency and contains a means which is operated different extents and is given an increment of movement whenever a signal of said one type is received, and includes another portion which responds to oscillations at said other frequency and contains a means which is operated different extents and is given an increment of movement whenever a signal of said other type is received, said receiving apparatus also including a control means which is jointly controlled by the differentially movable means in each portion which are operated by the signals, said control means including a plurality of portions, one portion being operated if the two differentially movable means have been operated by the proper number of signals in the first and second groups of signals and further portions which are operated when one or the other differentially operable means has been operated by the proper number of signals in a further group of signals as the sequence is received; and means controlled by the several portions of the control means of the receiving apparatus to effect a desired control or operation if the preassigned signal sequence has been received.

9. In a remote control system, the combination of a sending apparatus including an electronic oscillator having circuit constants normally enabling it to produce oscillations at one frequency, including means which, when operable, is effective to modify the circuit constants of the oscillator to cause it to produce oscillations at another frequency, and including a control means operable automatically to control the oscillator to produce the signals of a signal sequence by controlling when the oscillator will operate normally to produce oscillations at said one frequency and when the means will be operable to modify the operation of the oscillator to produce oscillations at said other frequency, said control means, by its control over the oscillator, enabling a preassigned signal sequence to be generated and transmitted, said signal sequence being made up of a group of signals containing a predetermined number of discrete signals of a first type, each signal of which is made up of oscillations at one of said frequencies, followed by a group of signals containing a predetermined number of discrete signals of a second type, each signal of which is made up of oscillations at the other of said frequencies, and in turn followed by a further group containing a predetermined number of signals of said first type, and followed still further by groups containing predetermined numbers of signals of the second type and then predetermined numbers of the first type until the desired sequence has been formed; a receiving apparatus including one portion which contains electronic means responsive to oscillations at said one frequency and contains a switch having a bank of contacts and a wiper which is given a step of movement relative to the contacts under control of the electronic means whenever a signal of the first type in any group is received and including another portion which contains electronic means responsive to oscillations at said other frequency and contains a switch having a bank of contacts and a wiper which is given a step of movement relative to the contacts under control of the electronic means whenever a signal of the second type in any group is received, and said receiving apparatus also including a plurality of auxiliary control relays which are selectively connected to the contact in both switches so that one of the auxiliary control relays will be operated if the proper number of signals in the first and second groups of signals have been received and have caused the wipers to engage the contacts to which it is connected, and a further auxiliary control relay will be operated each time a further group of signals is received, if the proper number of signals is received and the wipers engage contacts to which these relays are connected; and a circuit which is completed, if the preassigned signal sequence has been received and all the auxiliary control relays have operated, for effecting a desired control or operation.

10. In a remote control system, the combination of a sending apparatus which includes an electronic oscillator having circuit constants enabling it normally to produce oscillations at one frequency, from which oscillations at said one frequency, one type of signal is constituted, includes means which, when operable, is effective to modify the circuit constants of the oscillator to cause it to produce oscillations at another frequency, from which oscillations at said other frequency, another type of signal is constituted, and includes a signal sequence controlling switch having a bank of contacts, to certain of which contacts the modifying means is connected, and having a wiper automatically operable to engage the contacts of the bank one after another in succession and render the modifying means operable when the wiper engages a contact to which the modifying means is connected, the selective connection of the modifying means to the contacts enabling the switch to control the oscillator to oscillate for predetermined intervals selectively at one or the other of said frequencies to produce a preassigned signal sequence made up of a plurality of groups of signals, each group containing a preselected predetermined number of signals of said one type or said other type, with the type of signals for successive groups of signals alternating until the preassigned signal sequence is completed; a receiving apparatus which includes a portion which responds to oscillations at said one frequency and contains a means which is operated one step each time a signal of said one type in any group is received, and includes another portion which responds to oscillations at said other frequency and contains a means which is operated one step each time a signal of said other type in any group is received, said receiving apparatus also including a control means which is jointly controlled by the means in each portion which are given steps of operation by the signals, said control means including a plurality of portions, one portion being operated if the proper number of signals in the first and second groups of signals have been received and a different further portion being operated each time the proper number of signals in a further group of signals in the sequence has been received; and means controlled by the several portions of the control means of the receiving apparatus to effect a desired control or operation if the preassigned signal sequence has been received.

11. In a remote control system, the combination of a sending apparatus including oscillating means for producing oscillations selectively at either of two preselected frequencies, from which oscillations at one of said preselected frequencies, one type of signal is constituted, and from which oscillations at the other of said preselected frequencies, another type of signal is constituted, and including a step-by-step-operating controlling switch having wipers movable over banks of contacts and circuits selectively connected to contacts of the banks and to the oscillating means to enable the switch to control when and at which of the frequencies the oscillating means will oscillate, said switch, together with the particular connections used, controlling the oscillating means to generate and transmit a preassigned signal sequence containing said two kinds of signals, said signal sequence being made up of a plurality of groups of signals containing various predetermined numbers of signals of said one type and said other type, with the type of signals for successive groups of signals alternating until the preassigned signal sequence is completed; and a receiving apparatus including one portion which contains means responsive only to signals made up of oscillations at said one frequency to respond to signals of said one type and contains a switch having a bank of contacts and a wiper which is given a step of movement relative to the contacts to engage a different contact each time a signal of said one type is received and engage a different predetermined contact after each group of signals of said one type has been received, including another portion which contains means responsive only to signals made up of oscillations at said other frequency to respond to signals of said other type and contains a switch having a bank of contacts and a wiper which is given a step of movement relative to the contacts to engage a different contact each time a signal of said other type is received and engage a different predetermined contact after each group of signals of said other type has been received, and said receiving apparatus also including an auxiliary control means containing a plurality of auxiliary control relays which are selectively connected to selected contacts in both switches so that one of the auxiliary control relays will be operated if the number of signals in the first and second groups of signals have been received and have caused the wipers to engage the contacts to which it is connected in both switches, and others of the auxiliary relays will be operated when further groups of signals have been received and the wipers engage the contacts to which various ones of these relays are connected and including a circuit, which is completed by the auxiliary control means, over the operated auxiliary control relays, if the preassigned signal sequence has been received, for effecting a desired control or operation; said sending and receiving apparatus being adapted to be changed readily by simple changes in wiring connections to generate and respond to any other desired signal sequence merely by changing either the preselected frequencies used or by changing connections between the switch and the oscillating means in the sending apparatus and by correspondingly changing the connections between the switches and auxiliary control means in the receiving apparatus to vary the number of signals in the various groups, or by making both kinds of changes.

12. In a remote control system, the combination of means for generating signals one after another to form a signal sequence containing signals which are made up of oscillations at one frequency and signals which are made up of oscillations at another frequency, with the different types of signals being generated alternately in rapid succession; receiving means responsive to signals made up of oscillations at said one frequency and including a slow release relay operated when a signal made up of oscillations at said one frequency is received; receiving means responsive to signals made up of oscillations at said other frequency and including a slow release relay operated when a signal made up of oscillations at said other frequency is received, said relays, due to their slow release characteristic and to the rapidity at which the signals alternate, being re-energized before they can be released, whereby both relays will be operated concurrently and remain operated as long as rapidly alternating signals are received; and means rendered operable under control of the relays when they are concurrently operated.

13. In a remote control system, the combination of a sending apparatus which includes an oscillator normally tuned to produce oscillations at one frequency, includes means which, when operable, is effective to modify the operation of the oscillator to cause it to produce oscillations at another frequency, includes a rapidly-vibrating control means for rendering said modifying means operable and inoperable alternately to cause the oscillator to oscillate at one and then at the other of these frequencies to produce signals made up of oscillations at said one frequency which alternate with signals made up of oscillations at said other frequency, and includes manually operable means for rendering the rapidly-vibrating control means operable; and receiving apparatus which includes one portion which contains means responsive only to oscillations at said one frequency and contains a slow release relay which is operable whenever a signal is received which is made up of oscillations at this frequency and also includes another portion which contains means responsive only to oscillations at said other frequency and contains a slow release relay which is operated whenever a signal is received which is made up of oscillations at said other frequency, said relays, due to their slow release characteristic and due to the rapidity at which the signals alternate, being re-energized before they can be released whereby both relays will be operated concurrently and will remain operated as long as the alternating signals are received, and said receiving apparatus containing means controlled by both relays to be operated upon concurrent operation of the relays.

14. In a remote control system, the combination of a sending apparatus including an oscillator, including means for controlling the oscillator to generate signals one after another to form a signal sequence for causing a desired operation to take place, said signal sequence containing a predetermined combination of signals in which certain signals are made up of oscillations at one frequency and the remaining signals are made up of oscillations at another frequency, and including means for controlling the oscillator to generate signals which form a signal sequence containing a different combination of signals for interrupting said desired operation if it has been started; mechanism operable to perform said desired operation; and a receiving apparatus including means operable in response to the signals and effective, upon receipt of the predetermined combination of signals of said first-mentioned signal sequence, to initiate an operation of said mechanism, and including means operable in response to the signals and effective upon receipt of said different combination of signals, to interrupt the operation of said mechanism.

15. In a remote control system, the combination of a sending apparatus including an oscillator, including means for controlling the oscillator to generate signals one after another to form a signal sequence for causing a desired operation to take place, said signal sequence containing a predetermined combination of signals in which certain signals are made up of oscillations at one frequency and the remaining signals are made up of oscillations at another frequency, and including means for controlling the oscillator to generate the above two types of signals alternately in rapid succession for causing interruption of said desired operation if it has been started; mechanism operable to perform said desired operation; and a receiving apparatus including means operable in response to the signals and effective, upon receipt of the predetermined combination of signals of said first-mentioned signal sequence, to initiate an operation of said mechanism, and including means operable in response to the signals and effective upon receipt of said rapidly alternating signals, to interrupt the operation of said mechanism.

16. In a remote control system, the combination of a receiving apparatus which includes means displaceable from a normal, home position in response to signals which are made up of oscillations of one frequency and signals which are made up of oscillations at another frequency to cause a desired operation to take place if a particular signal sequence containing a predetermined numbers of the different kinds of signals in a predetermined combinational sequence is received, and which includes means for restoring the displaceable means to normal home position when said two types of signals are received alternately in rapid succession; and a sending apparatus which includes oscillating means, includes normally inoperable means which, when operable, controls the oscillating means to generate and transmit the two types of signals alternately rapidly in succession, and includes a control means which is initially operable to render the normally inoperable means operable, to cause the rapidly-alternating signals to be generated and transmitted, and which is further operable thereafter to control the oscillating means to cause the particular signal sequence to be generated, the signals sent from the sending apparatus first restoring the means in the receiving apparatus to home position, then operating the receiving apparatus according to the particular signal sequence whereby the receiving apparatus will be cleared of any erroneous setting and will operate from its normal home position to cause the desired operation to take place when said particular signal sequence is received.

17. In a remote control system, the combination of a receiving apparatus which includes means displaceable from a normal home position in response to various combinations of signals to cause a desired operation to take place if a particular combination of signals is received, and which includes means for restoring the displaceable means to normal position in response to a different combination of signals; and a sending apparatus which includes oscillating means, includes means to control the oscillating means to generate said different combination of signals, and also includes means operable at will to control the oscillating means to produce said particular combination of signals, said means which controls the oscillating means to produce said different combination of signals, if operated immediately before the other control means for the oscillating means, causing the displaceable means in the receiving apparatus to be restored to their home position and thereby insuring that the displaceable means will be operated correctly and cause the desired operation to take place when said particular combination of signals is received.

CEBERN B. TRIMBLE.

REFERENCES CITED

The following references are of record in the file of this patent:

UNITED STATES PATENTS

| Number | Name | Date |
| --- | --- | --- |
| 1,140,378 | Kleinschmidt | May 25, 1915 |
| 1,661,962 | Robinson | Mar. 6, 1928 |
| 1,702,423 | Wensley | Feb. 19, 1929 |
| 1,760,479 | Colman | May 27, 1930 |
| 1,783,633 | Stewart | Dec. 2, 1930 |
| 2,041,079 | Lyle | May 19, 1936 |
| 2,095,688 | Ballentine | Oct. 12, 1937 |
| 2,096,954 | Bellamy | Oct. 26, 1937 |
| 2,192,217 | Bellamy | Mar. 5, 1940 |
| 2,198,901 | Boswau | Apr. 30, 1940 |
| 2,248,937 | Bellamy | July 15, 1941 |
| 2,255,162 | Hart | Sept. 9, 1941 |
| 2,325,829 | Boswau | Aug. 3, 1943 |
| 2,381,499 | Jackel | Aug. 7, 1945 |
| 2,393,377 | Jackel | Jan. 22, 1946 |
| 2,394,080 | Laurenson | Feb. 5, 1946 |
| 2,411,375 | Jackel | Nov. 19, 1946 |
| 2,462,655 | McHenry | Feb. 22, 1949 |